(No Model.)
H. FUCHS.
BARB WIRE MACHINE.
No. 278,930. Patented June 5, 1883.
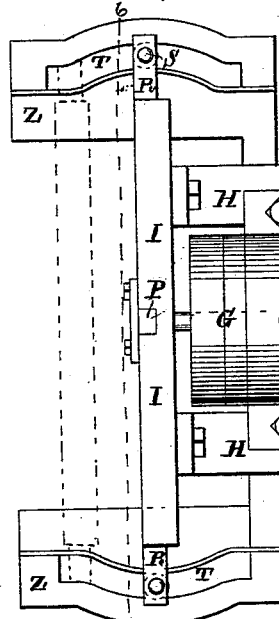
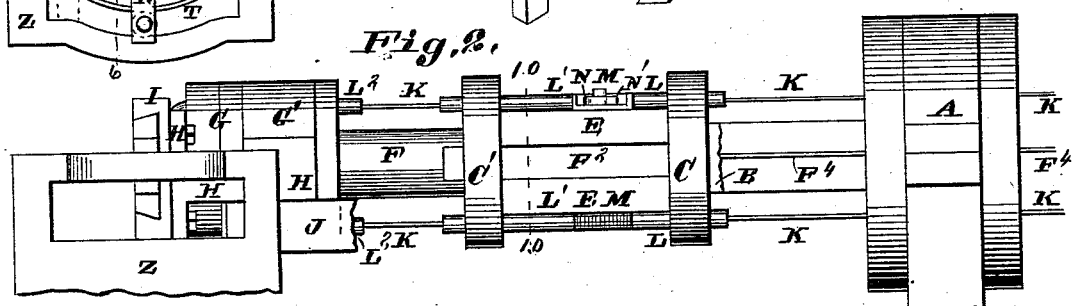
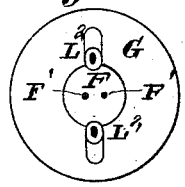
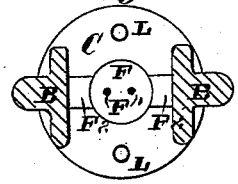
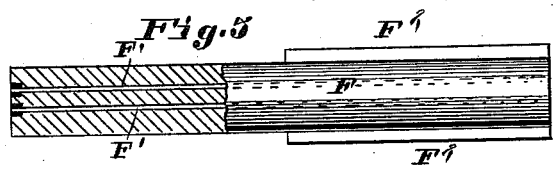
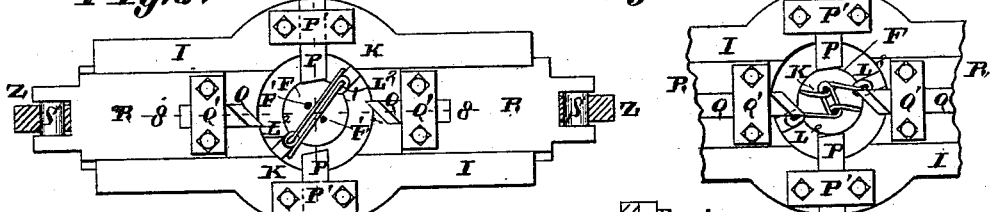
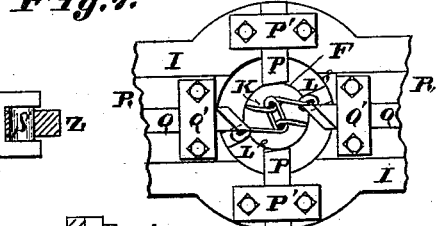
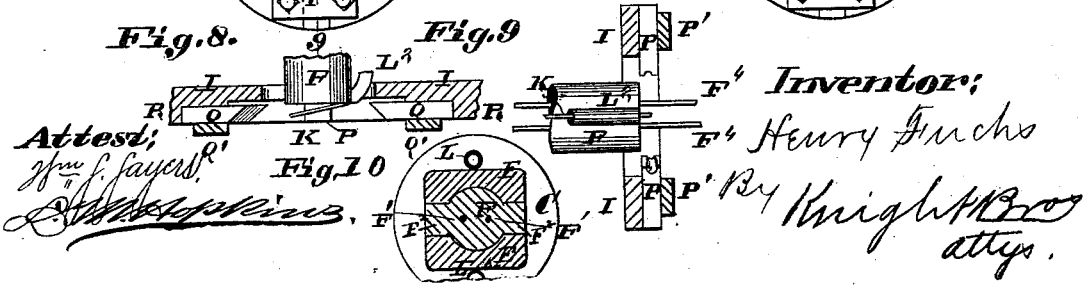
Inventor:
Henry Fuchs
By Knight Bro
attys.
Attest:

UNITED STATES PATENT OFFICE.

HENRY FUCHS, OF ST. LOUIS, MISSOURI.

BARB-WIRE MACHINE.

SPECIFICATION forming part of Letters Patent No. 278,930, dated June 5, 1883.

Application filed January 24, 1883. (No model.)

*To all whom it may concern:*

Be it known that I, HENRY FUCHS, of the city of St. Louis, in the State of Missouri, have invented a certain new and useful Improvement in Barb-Wire Machines, of which the following is a full, clear, and exact description, reference being had to the accompanying drawings, forming part of this specification, and in which—

Figure 1 is a detail top view of a machine embodying my improvement. Fig. 2 is a detail side elevation of same. Fig. 3 is an end view of the reciprocating revolving head carrying the spindle and tubes through which the wires pass. Fig. 4 is a transverse section taken on line 4 4, Fig. 1. Fig. 5 is a top view, part in section, of the spindle through which the main wires pass. Fig. 6 is a section taken on line 6 6, Fig. 1, showing the frame that carries the knives or cutters and formers in front view, and showing the barb-wires just as they have been protruded from their tubes by the backward movement of the head which carries the tubes, the wires being held from moving back with the head before coming in contact with the formers; and Fig. 7 is a detail view of the same after the barbs are formed and cut off. Fig. 8 is a horizontal section taken on line 8 8, Fig. 6, looking up. Fig. 9 is a vertical section taken on line 9 9, Fig. 6; and Fig. 10 is a transverse section taken on line 10 10, Fig. 2. Fig. 11 is a perspective view of one of the cutters, and Fig. 12 is a perspective of one of the stops for the barb-wires.

My invention relates to certain improvements on an otherwise old and well-known machine, and therefore I have only shown and need only describe such parts as my invention relates to and the parts of an old machine to which my improvements are attached.

Referring to the drawings, A represents part of a flier, of well-known construction, having arms B B, to the outer ends of which is secured a disk, C, which is connected to a second and similar disk, C', by plates E, the disks thus being carried around by the flier. The plates E are a short distance apart, as shown in Fig. 10, and their adjacent surfaces have concavities, between which fits a spindle, F, which has two perforations or holes, F', through which the main wires $F^4$ pass. The spindle also has two feathers, $F^2$, one on each side, which fit between the plates E, (see Fig. 10,) and thus the spindle is compelled to revolve with the flier, but is not prevented from having an endwise movement. On the end of the spindle—the end farthest from the flier—is rigidly secured a head, G, journaled in a box, G', secured to plates H, which connect with a cross-bar, I, and which slide back and forth, as the head and spindle reciprocate, on plates or bars J, supported by the frame of the machine, part of which is shown, and lettered Z. The head G is thus free both to revolve and reciprocate, and as a matter of course it, in its reciprocating motion, carries the cross-bar I, as it is secured thereto, as stated; but as the head turns in its journal-box it can revolve freely without carrying the bar I around with it. The box G' is set into the head, as shown in Fig. 2, so as to be reciprocated with it. The main wires pass from the perforated spindle through an opening in the block or bar I, (see Figs. 8 and 9,) the opening being large enough to receive both of them, and from there pass over a revolving cog or sprocket wheel, (not shown,) which feeds them continuously to the spool. As this cog-wheel revolves vertically and the spindle horizontally, the main wires are thus twisted together.

The wires K, (I have shown two, the machine being constructed for making four-pointed barbs,) from which the barbs are taken, pass from the flier through short tubes L, fitting loosely in holes made to receive them in the disk C, (see Fig. 2,) from there through blocks M, to which the ends of the tubes L are secured, (see Figs. 2 and 1,) from there through short tubes L', secured to the other sides of the blocks M, and which fit loosely in holes in the disk C', (see same figures,) and from there the wires pass through tubes $L^2$, rigidly secured in the head G, their forward ends being flush with the face of the head, and turned toward the center of the head, as shown in Figs. 3 and 9, (one only being shown in Fig. 9.) Thus as the wires are forced from the head they are made to cross it, as shown in Fig. 6. As the head makes its forward movement the barb-wires are carried forward with it, as they are at this time made fast to the main wires, which prevents them from being drawn out of the head, and as it moves back, the wires, being held from moving back with it, protrude from it, crossing the head, as shown and stated.

The wires are held from being carried back by the head by means of dogs or pawls N, pivoted to the blocks M, and held in contact with the wires by means of suitable springs, N', (see Fig. 1,) the dogs not preventing the head from pulling the wires through, but preventing it from carrying them back. As the head may have more movement than the length of wires wanted for a single barb, it becomes necessary to arrange the blocks M so that they will be carried, with the head, a short distance each time, through means of the barb-wires, and to regulate the amount of this movement. The amount of movement of the blocks is regulated by set-screws O O', passing through the disks C C'. (See Fig. 1.) Thus when the head moves forward, the dogs pressing pretty hard against the barb-wires, it carries the blocks forward with it until they (the blocks) come against the set-screws O, the tubes slipping through the disks, and then, the blocks being held from further movement in this direction, the head pulls the wires forward, as described, the dogs allowing them to slip past. As the head reaches its extreme forward movement the barbs are cut off, having been formed on the main wires, as hereinafter described, and as the head moves back it first forces the blocks M back, through means of the barb-wires, until they come against the set-screws O', and then, being unable to move farther while the head continues to move back, they hold the barb-wires through means of the dogs, which causes them (the wires) to protrude from the head, as described, the necessary distance to form a barb of the desired length. By changing the position of one of the set-screws, so as to allow the blocks to move a greater or less distance, it will be seen that any desired length of barb may be had.

When the head has moved back, protruding the wires, and as it is continually revolving, as described, the ends of the wires are brought against stationary stops P, rigidly secured to the bar I by clamps P' or otherwise, (see Figs. 6 and 7,) and are bent around the main wires, as shown in Fig. 7. While the barb-wires are thus being wound around the main wires the head makes its forward movement, traveling at the same rate of speed as the main wires, as, of course, is necessary not to spread the barbs out. The adjacent ends of the stops P are notched, as shown in Fig. 12, so that the barb-wires will not slip off them. As the head reaches its forward movement, cutters Q are thrust forward, which pass over the ends of the tubes L², (which just at this time are revolving before them,) cutting the barbs off.

Preferably the end of the spindle would be provided with suitable knives, an example of which is shown in Fig. 5, they being simple round hard bushings that can be renewed as they become worn, which would act in conjunction with the knives Q to do the cutting. The knives are secured to the inner ends of sliding blocks R by clamps Q' or other suitable means, which work in grooves of the cross-bar I as the head reciprocates.

The blocks are operated by pins S in their outer ends, passing through cam-slots T in the frame Z. (See Figs. 1 and 6.) As the head moves back it will be seen that the knives will be drawn away from each other, the blocks carrying them moving back with the head and pulled out by being connected with the pins that work in the cam-grooves, and as the head moves forward they are thrust toward each other, cutting off the barbs.

I have not shown any means for reciprocating the head, as any well-known eccentric or lever power may be used.

I claim as my invention—

1. In a wire-barbing machine, a spindle having a compound revolving and reciprocating motion, and having two distinct perforations for the passage of the main wires, and carrying a head having bent tubes for the passage of the barb-wires, and a cross-bar having fixed stops for the free ends of the barb-wires, and moving knives, in combination with suitable operating mechanism, substantially as shown and described.

2. In a wire-barbing machine, in combination with a reciprocating revolving head, through which the barb-wires pass, and a revolving flier carrying two disks connected by suitable plates, tubes connecting the disks, through which the barb-wires pass, having located between and attached to them sliding blocks, with means for limiting their movement and provided with dogs, for the purpose set forth.

3. In a wire-barbing machine, in combination with a reciprocating revolving head through which the barb-wires pass, and a revolving flier carrying two disks connected by suitable plates, tubes connecting the disks, through which the barb-wires pass, having sliding blocks located between and attached to them, provided with dogs, the extent of their movement being regulated by set-screws passing through the disks, substantially as shown and described, for the purpose set forth.

HENRY FUCHS.

Witnesses:
 GEO. H. KNIGHT,
 ALBERT G. FISH.